Jan 6, 1931.  W. J. HENDRON  1,787,681
REFRIGERATING APPARATUS
Filed Nov. 6, 1929  4 Sheets-Sheet 1
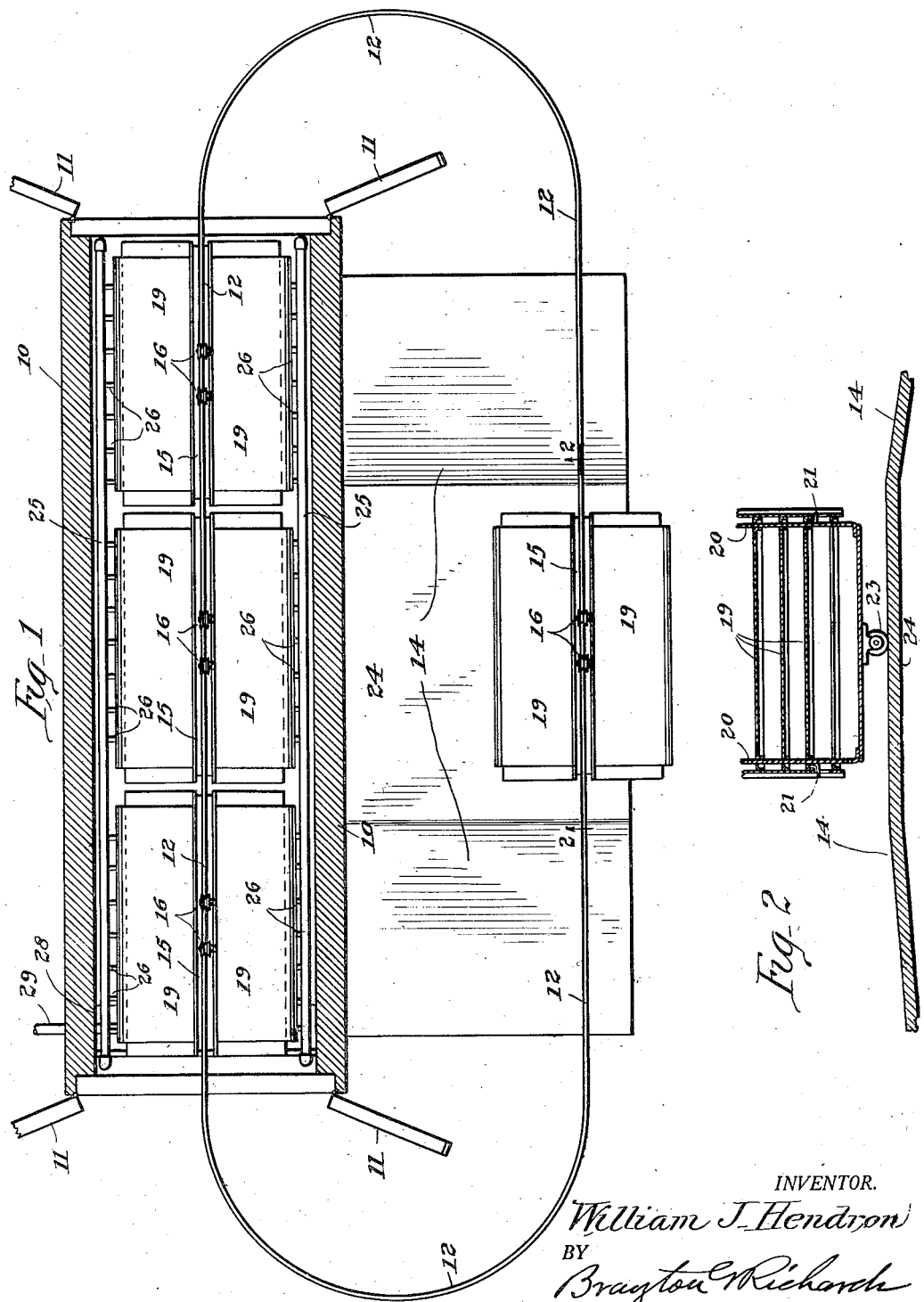
INVENTOR.
William J. Hendron
BY
Brayton & Richards
ATTORNEYS

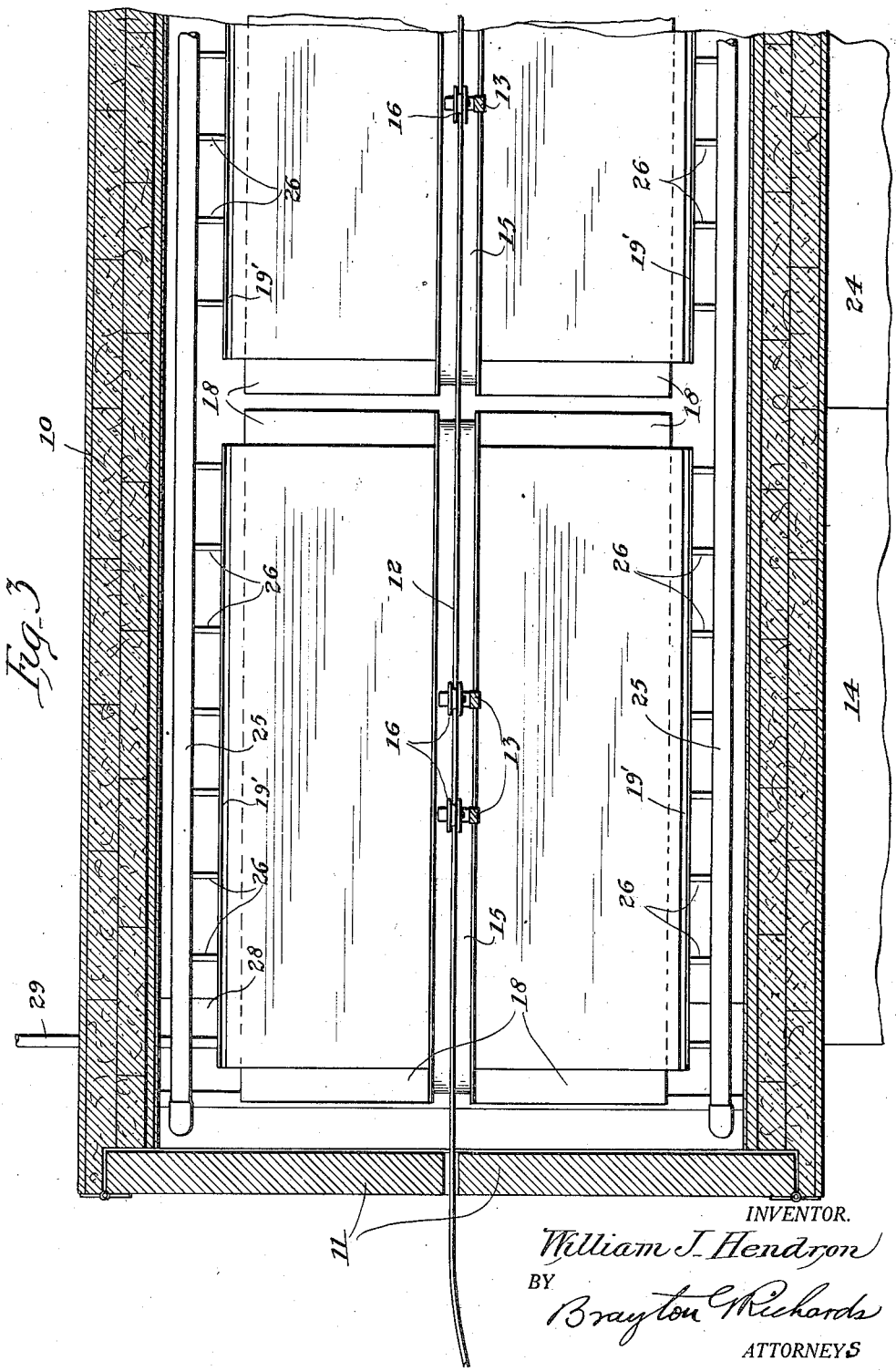

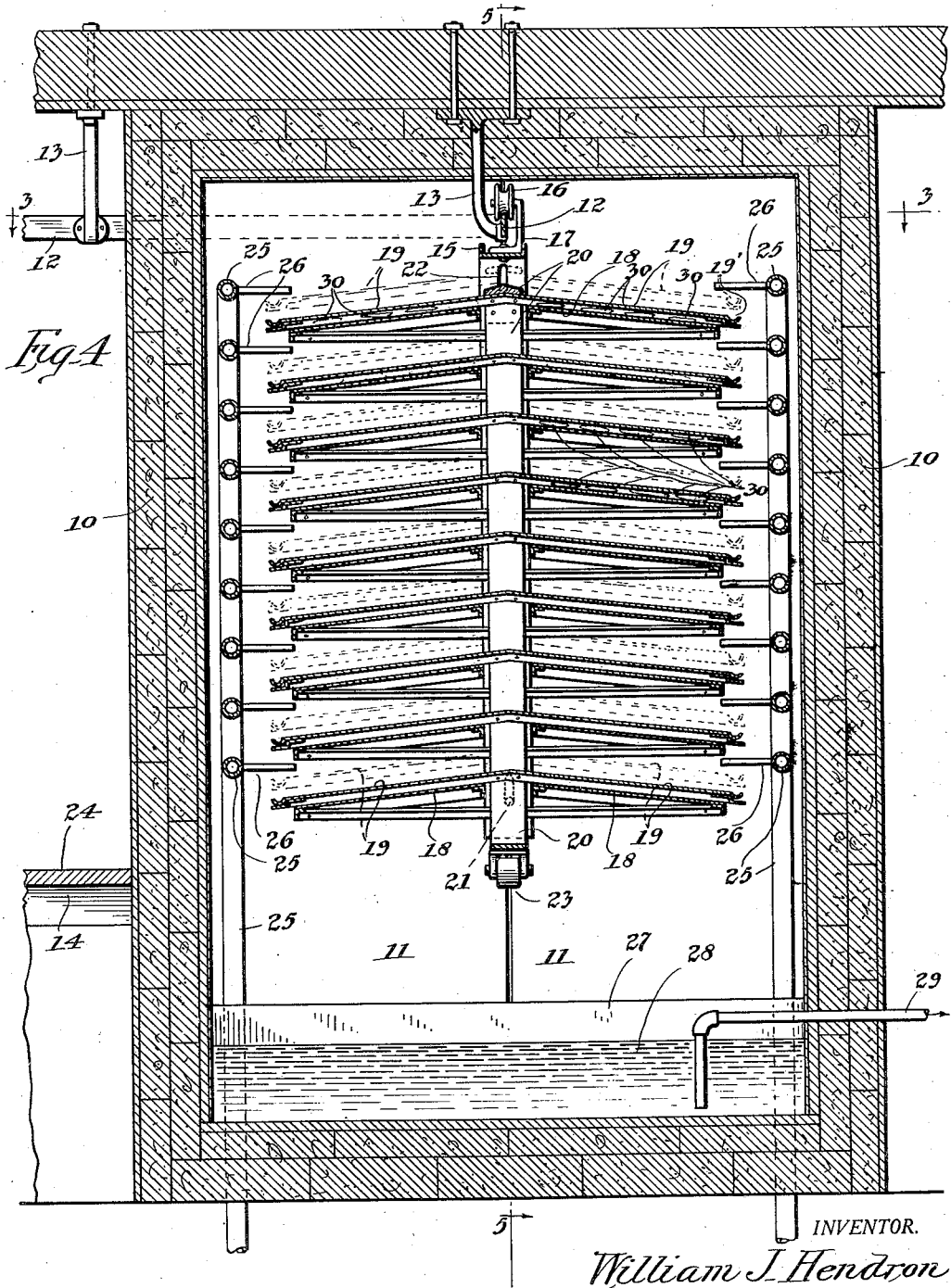

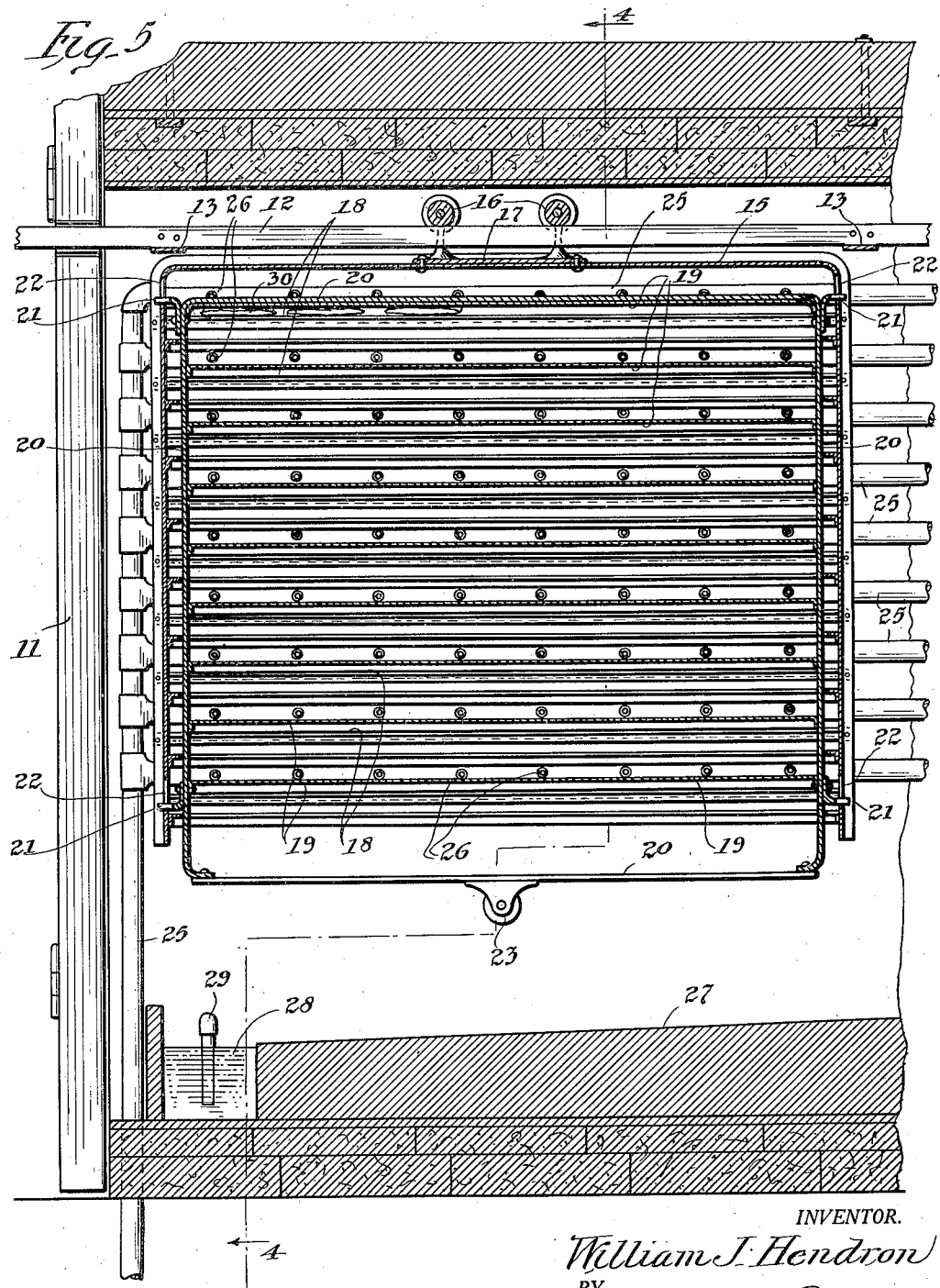

Patented Jan. 6, 1931

1,787,681

UNITED STATES PATENT OFFICE

WILLIAM J. HENDRON, OF LOMBARD, ILLINOIS, ASSIGNOR TO BOOTH FISHERIES COMPANY, OF CHICAGO, ILLINOIS, A CORPORATION OF DELAWARE

REFRIGERATING APPARATUS

Application filed November 6, 1929. Serial No. 405,085.

The invention relates to improvements in refrigerating apparatus especially adapted for use in freezing and preserving fish or the like, the primary object of the invention being to provide an improved apparatus of the character indicated by means of which quantities of fish or the like may be economically and efficiently frozen or refrigerated.

Another object of the invention is the provision of an improved apparatus of the character indicated having efficient means incorporated therein facilitating the loading and unloading of the same.

Another object of the invention is the provision of improved apparatus of the character indicated having special provision therein for protecting the fish or other material being refrigerated.

Other objects will appear hereinafter.

The invention consists in the combinations and arrangements of parts hereinafter described and claimed.

The invention will be best understood by reference to the accompanying drawings forming a part of this specification and in which, Fig. 1 is a diagrammatic plan and horizontal sectional view of appartus embodying the invention;

Fig. 2 a section taken substantially on the line 2—2 of Fig. 1;

Fig. 3 a partial horizontal section through a refrigerating room employed in the apparatus, said partial section being taken substantially on the line 3—3 of Fig. 4;

Fig. 4 a vertical transverse section of the refrigerating room, said section being taken substantially on the line 4—4 of Fig. 5; and Fig. 5 a partial longitudinal vertical section taken substantially on line 5—5 of Fig. 4.

The embodiment of the invention illustrated in the drawings comprises a suitable refrigerating room 10 having suitably insulated walls as indicated. Outwardly swinging doors 11 are arranged at each end of said refrigerating room and an overhead track 12 is mounted to pass longitudinally through the said room being supported on suitable overhead hangers 13 as shown. The overhead track 12 is made in the form of a continuous closed loop and a loading and unloading station 14 is arranged along said track outside of the refrigerating room.

A plurality of carriers are mounted to travel on the track 12. Each of said carriers comprises a main supporting frame 15 made of channel iron bent into substantially inverted U-form as best shown in Fig. 5. The supporting frame thus provided is supported on two grooved rollers 16 running upon the track 12 and carried by a suspending bracket 17 secured centrally to the top of the supporting frame 15. Arranged on the supporting frame 15 is a plurality of outwardly, laterally and downwardly sloping supporting shelves 18 adapted and arranged to support fish or other material to be frozen or refrigerated.

Associated with each of the shelves 18 is a cover 19 extending entirely over the same and protecting the material thereon from contact with the brine used in the refrigerating process.

Arranged along the outer edges of the shelves 19 are gutters 19' for conveying the brine dripping or flowing from the covers 19 away from the outer edges of the shelves 18, thereby facilitating loading and unloading of said shelves. The covers 19 are all rigidly attached to a vertically shiftable frame 20 arranged within the supporting frame 15 and provided at the four corners with guide brackets 21 sliding in vertical slots 22 in said supporting frame, and whereby the shiftable frame 20 and the covers 19 thereon will be guided during vertical reciprocations. At its bottom the frame 20 is provided with a centrally located lifting roller 23 for cooperation with a cam member 24 located at the loading station 14. By this arrangement as each of the carriers is pushed or otherwise forced along the track 12 up to the loading station 14, the corresponding roller 23 will engage the cam member 24 and the cover frame 20 thereby elevated to simultaneously elevate all of the covers 19 to give free access to the shelves 18 for unloading and loading purposes. As the carrier is removed from the loading station, the roller 23 runs down the opposite side of the cam member 24 thereby lowering the cover members 19 into contact or close association with the fish or other material placed upon the shelves 18 at said loading station.

Arranged within the refrigerating room 10 is a system of brine supply pipes 25 equipped with spray nozzles 26 projecting between the shelves 18 as shown and adapted and arranged to project sprays of refrigerating brine onto the tops of the covers 19 and against the undersides of the shelves 18, thereby freezing or refrigerating the fish or material on said shelves and at the same time protecting said material from actual contact with the brine.

The bottom 27 of the refrigerating room 10 is sloped as shown toward a receiving well 28 into which the brine flowing and draining from the shelves 18 and covers 19 will be directed. This used brine is removed through a suction pipe 29 and returned to the refrigerating apparatus for recooling and return to the brine supply pipes 25, as will be readily understood.

In use and in operation the fish 30 or other material to be frozen is arranged as indicated on the shelves 18 with the covers 19 resting upon or in close proximity thereto. When fully loaded the carriers are pushed or otherwise moved into the refrigerating room 10 where sprays of refrigerating brine are sprayed thereover through the nozzles 26. When the material has been sufficiently frozen or otherwise refrigerated, the carriers are moved out of the refrigeration room to the unloading station 14 where the frozen material is removed and fresh material loaded onto the shelves 18. In this way fish or other material may be quickly and economically frozen or refrigerated in large quantities. Obviously, while the load of material on one set of carriers is being frozen, another set of carriers may be fully unloaded and loaded with fresh material.

In this way a practically continuous process can be carried on and thereby large quantities of material quickly and economically frozen or refrigerated. The specific form and arrangement of parts is a simple and effective one for the purpose.

While I have illustrated and described the preferred form of construction for carrying the invention into effect, this is capable of variation and modification without departing from the spirit of the invention. I therefore do not wish to be limited to the precise details set forth, but desire to avail myself of such variations and modifications as fall within the scope of the appended claims.

Having thus fully described my invention, what I claim as new and desire to secure by Letters Patent is:

1. Apparatus of the class described comprising a refrigerating room having means of refrigeration therein; an overhead track leading into and out of said room; a carrier suspended from and traveling on said track; a plurality of supporting shelves on said carrier; and shiftable covers for said shelves.

2. Apparatus of the class described comprising a refrigerating room having refrigerating sprays therein; an overhead track leading into and out of said room; a carrier suspended from and traveling on said track; a plurality of supporting shelves on said carrier; and shiftable covers for said shelves.

3. Apparatus of the class described comprising a refrigerating room having refrigerating sprays therein; an overhead track leading into and out of said room; a carrier suspended from and traveling on said track; a plurality of supporting shelves on said carrier; vertically shiftable covers for said shelves; a loading station along said track outside of said room; and means at said loading station for automatically raising said covers.

4. Apparatus of the class described comprising a refrigerating room having refrigerating sprays therein; an overhead track leading into and out of said room; a carrier suspended from and traveling on said track; a plurality of supporting shelves on said carrier; a vertically shiftable frame on said carrier; a cover on said frame for each of said shelves; and means for shifting said frame to raise and lower said covers to facilitate loading and unloading of said shelves.

5. Apparatus of the class described comprising a refrigerating room having refrigerating sprays therein; an overhead track leading into and out of said room; a carrier suspended from and traveling on said track; a plurality of supporting shelves on said carrier; a vertically shiftable frame on said carrier; a cover on said frame for each of said shelves; a loading station along said track outside of said room; and means at said loading station for automatically raising said frame.

6. Apparatus of the class described comprising a refrigerating room having refrigerating sprays therein; an overhead track leading into and out of said room; a carrier suspended from and traveling on said track; a plurality of supporting shelves on said carrier; a vertically shiftable frame on said carrier; a cover on said frame for each of said shelves; a loading station along said track outside of said room; and a cam member at said loading station for contacting with and automatically raising said frame.

7. Apparatus of the class described comprising a refrigerating room having a system of refrigerating pipes arranged therein; doors at each end of said room; an overhead track leading through said room and into and out of said doors; a carrier suspended from and traveling on said track; a plurality of supporting shelves on said carrier; a plurality of spray nozzles connected with said pipes and projecting between said shelves; a vertically shiftable frame on said carrier; a cover on said frame for each of said shelves; and means for shifting said frame to raise and lower said covers to facilitate loading and unloading of said shelves.

8. Apparatus of the class described comprising a refrigerating room having a system of refrigerating pipes arranged therein; doors at each end of said room; an overhead track leading through said room and into and out of said doors; a carrier suspended from and traveling on said track; a plurality of supporting shelves on said carrier; a plurality of spray nozzles connected with said pipes and projecting between said shelves; a vertically shiftable frame on said carrier; a cover on said frame for each of said shelves; a loading station along said track outside of said room; a cam member at said loading station; and a central roller on the bottom of said shiftable frame adapted and arranged to engage said cam member and raise and lower said shiftable frame as said carrier passes said loading station.

9. A carrier for refrigeration apparatus comprising a main supporting frame; a plurality of shelves on said frame; shiftable covers for said shelves; and means for shifting said covers to facilitate loading and unloading of said shelves.

10. A carrier for refrigeration apparatus comprising a main supporting frame; a plurality of shelves on said frame; shiftable covers for said shelves; and means for simultaneously shifting all of said covers to facilitate loading and unloading of said shelves.

11. A carrier for refrigeration apparatus comprising a main supporting frame; a plurality of shelves on said frame; a vertically shiftable frame on said supporting frame; a cover on said shiftable frame for each of said shelves; and means for shifting said shiftable frame.

12. A carrier for refrigeration apparatus comprising a main supporting frame; a plurality of outwardly and downwardly sloping shelves on said frame; outwardly and downwardly sloping shiftable covers for said shelves; and means for shifting said covers to facilitate loading and unloading of said shelves.

13. A carrier for refrigeration apparatus comprising a main supporting frame; a plurality of outwardly and downwardly sloping shelves on said frame; outwardly and downwardly sloping shiftable covers for said shelves; and means for simultaneously shifting all of said covers to facilitate loading and unloading of said shelves.

14. A carrier for refrigeration apparatus comprising a main supporting frame; a plurality of outwardly and downwardly sloping shelves on said frame; a vertically shiftable frame on said supporting frame; an outwardly and downwardly sloping cover on said shiftable frame for each of said shelves; and means for shifting said shiftable frame.

15. A carrier for refrigeration apparatus comprising a main supporting frame substantially in inverted U form; a supporting bracket at the top of said frame; two supporting rollers arranged on said bracket and adapted and arranged to run upon an overhead track; a plurality of outwardly and downwardly sloping supporting shelves on said supporting frame; an outwardly and downwardly sloping cover for each of said shelves and mounted on said vertically shiftable frame; gutters at the outer edges of said covers; and cam engaging means on said vertically shiftable frame for automatically raising the same.

16. A carrier for refrigeration apparatus comprising a main supporting frame substantially in inverted U form; a supporting bracket at the top of said frame; two supporting rollers arranged on said bracket and adapted and arranged to run upon an overhead track; a plurality of outwardly and downwardly sloping supporting shelves on said supporting frame; an outwardly and downwardly sloping cover for each of said shelves and mounted on said vertically shiftable frame; gutters at the outer edges of said covers; and a cam roller mounted centrally on the bottom of said vertically shiftable frame and adapted and arranged to be engaged by a cam member for raising and lowering said shiftable frame.

17. Apparatus of the class described comprising a refrigerating room having means of refrigeration therein; a carrier arranged and adapted to enter and leave said room; a plurality of supporting shelves on said carrier; and shiftable covers for said shelves.

18. Apparatus of the class described comprising a refrigerating room having refrigerating sprays therein; a carrier arranged and adapted to enter and leave said room; a plurality of supporting shelves on said carrier; and shiftable covers for said shelves.

In witness whereof, I have hereunto set my hand this 30th day of October, 1929.

WILLIAM J. HENDRON.